(12) United States Patent
Meredith et al.

(10) Patent No.: US 7,642,199 B2
(45) Date of Patent: Jan. 5, 2010

(54) SILICA AND SILICA-LIKE FILMS AND METHOD OF PRODUCTION

(75) Inventors: Paul Meredith, Brisbane (AU); Michael Harvey, Brisbane (AU)

(73) Assignee: Xerocoat Inc., Redwood City, CA (US)

( * ) Notice: Subject to any disclaimer, the term of this patent is extended or adjusted under 35 U.S.C. 154(b) by 436 days.

(21) Appl. No.: 11/444,283

(22) Filed: May 31, 2006

(65) Prior Publication Data

US 2006/0286813 A1    Dec. 21, 2006

Related U.S. Application Data

(63) Continuation-in-part of application No. PCT/AU2004/001622, filed on Nov. 22, 2004.

(30) Foreign Application Priority Data

May 31, 2005    (AU)    ............... 2005902785

(51) Int. Cl.
    *H01L 21/469*    (2006.01)
    *C04B 14/04*    (2006.01)
(52) U.S. Cl. .................. 438/781; 106/490; 257/632; 428/448; 524/394; 427/240; 427/430.1; 427/376.2; 427/377; 427/397.7; 427/397.8
(58) Field of Classification Search .................. 106/490; 438/781; 524/394; 428/447
    See application file for complete search history.

(56) References Cited

U.S. PATENT DOCUMENTS

| | | | | |
|---|---|---|---|---|
| 3,922,392 | A | * | 11/1975 | Kohlschutter et al. ........ 427/215 |
| 5,639,517 | A | * | 6/1997 | Floch et al. ................... 427/5 |
| 5,698,266 | A | | 12/1997 | Floch et al. |
| 6,099,911 | A | | 8/2000 | Yano et al. |
| 6,291,697 | B1 | | 9/2001 | Tanaka et al. |
| 6,403,183 | B1 | | 6/2002 | Iwamiya et al. |
| 6,511,721 | B1 | | 1/2003 | Murata et al. |
| 6,599,976 | B2 | | 7/2003 | Kobayashi et al. |
| 6,610,145 | B2 | * | 8/2003 | Hendricks et al. ............ 118/52 |
| 2002/0041932 | A1 | * | 4/2002 | Ogawa .................... 427/376.2 |
| 2004/0028915 | A1 | * | 2/2004 | Shibuya et al. ............. 428/447 |

(Continued)

FOREIGN PATENT DOCUMENTS

EP    834488 A    4/1998

(Continued)

OTHER PUBLICATIONS

ColCoat Co Ltd. fact sheet printed from the website of said company.*

(Continued)

*Primary Examiner*—Karl E Group
*Assistant Examiner*—Pegah Parvini
(74) *Attorney, Agent, or Firm*—Harness, Dickey & Pierce, P.L.C.

(57) ABSTRACT

A method of producing a silica or silica-like coating by forming a precursor formulation from oligomeric organosilicate. The precursor formulation is coated on a substrate as a continuous liquid phase. The precursor formulation is then cured in an ammoniacal atmosphere to produce a continuous, interconnected, nano-porous silica network.

15 Claims, 3 Drawing Sheets

U.S. PATENT DOCUMENTS

2004/0048960 A1* 3/2004 Peterson et al. ............. 524/261

FOREIGN PATENT DOCUMENTS

| EP | 1074859 A | 2/2001 |
|---|---|---|
| JP | 04-180977 | 6/1992 |
| JP | 08-120225 | 5/1996 |
| JP | 10-226767 | 8/1998 |
| JP | 10-316934 | 12/1998 |
| WO | WO 94/23315 | 10/1994 |

OTHER PUBLICATIONS

Ishino et al., "Mass production of hydrophobic silica aerogel and readout optics of Cherenkov light", Nuclear Instruments and Methods in Physics Research A 457 (2001) pp. 581-587.

* cited by examiner

SILICA AND SILICA-LIKE FILMS AND METHOD OF PRODUCTION

CROSS-REFERENCE TO RELATED APPLICATIONS

This application is a continuation-in-part of United States national phase application from PCT/AU2004/001622 filed 22 Nov. 2004 and claims priority from Australian provisional patent application 2005902785 filed 31 May 2005. The disclosures of the above applications are incorporated herein by reference.

FIELD OF INVENTION

This invention relates to silica or silica-like films, a method of production thereof and the use of the silica or silica-like films as anti-reflective and/or anti-fogging and/or protective coatings. In particular the invention relates to silica or silica-like films having a refractive index lower than or equal to typical silica glass.

BACKGROUND

Typically low refractive index thin films are made utilising sol-gel processes or vacuum evaporation deposition techniques. The following prior art documents are but a few examples of methods used to produce low refractive index films made from silica.

WO 02/41043 is directed to a method of forming a mesostructured inorganic/block copolymer composite or inorganic porous solid doped with a dye or dye sensitive agents, formed by creating a silica sol-gel from tetraethoxysilane (TEOS), ethanol and water. The sol-gel is then templated with block copolymers, such as poly(ethylene oxide)-poly(alkyene oxide)-poly(ethylene oxide). The inorganic/organic composite is then calcined or subjected to solvent extraction to remove excess block copolymer species, prior to doping with dye/dye sensitive agents.

U.S. Pat. No. 6,379,776 is directed to a multi-layer, anti-fogging and stain preventing glass coating comprising an alkaline shut-off film, a silica oxide/zirconium oxide composite, and a photocatalytic film, of titanium oxide. Both the silica oxide/zirconium oxide composite layer and the titanium oxide layers are formed using known sol-gel processes.

US 2002/0090519 describes a method of hydrolytically polycondensing tetraalkoxysilanes to form a silica oxide sol. The hydrolytic polycondensation occurs by placing the tetraalkoxysilane in an aqueous alcohol ammoniacal solution to encourage hydrolysis of the tetraalkoxysilane and produce silica oxide particles. The sol is subject to steam distillation in order to remove the alcohol and ammonia prior to the pH being adjusted to between 3 and 8. Surfactants are then added to the silica sol to act as pore templates during the coating of a substrate. The coating is calcined to cure the silica film and remove the surfactants.

U.S. Pat. No. 5,948,482 is directed to a method of forming an aerogel thin film at ambient pressure, by forming a silica oxide sol-gel using standard processes before derivatizing the surface of the gel with a hydrolysable organic substituent, reliquefying the sol with sonication and depositing the gel onto a substrate.

U.S. Pat. No. 5,698,266 is directed to a modification of the standard sol-gel method of forming an anti-reflective coating by mixing ethanol, tetraethoxysilane (TEOS) and ammonia and hydrolysing for up to 48 hours to form a colloidal silicon oxide suspension dispersed in an aliphatic alcohol. The silica sol is then filtered to obtain silica particles for deposition onto a substrate, prior to drying. The coated substrate is placed in an ammoniacal environment for up to twelve hours to form an anti-reflective coating. This final step is claimed to improve the binding between the silica particles, and so renders the film more robust.

C. Shelle et al, J. Non-Cryst. Solids, 218, pg 163, 1997, describes a method of producing anti-glare glass films using sol-gel coatings formed from methyltriethoxysilane, tetra-ethoxysilane and tin oxide. The sol-gel is aged at 0° C. prior to deposition onto a substrate and calcining at 500° C.

G Wu, et al, J. Non-Cryst. Solids, 275, pg 169, 2000, describes a method of creating a sol-gel, in which tetraethoxysilane (TEOS) is catalysed in a two step acid-base process. The TEOS is initially aged in an ammonia-ethanol solution, pH adjusted, refluxed and a second pH adjustment made. In preparing the films, G. Wu et al deposit the sol-gel onto a substrate and expose to an ammoniacal environment.

Hass D. D. et al, NASA Contractor Report, 201733, teaches the coating of fibrous insulation with a reflective film such as silica, titanium dioxide, zirconium oxide and/or combinations thereof. The oxides are formed using known sol-gel processes into which the fibrous insulation is submersed to coat the fibres prior to vacuum or heat drying.

The above processes which rely on sol-gel techniques for producing thin films are complex, multi-step processes which are costly, involve high temperature steps in fabrication, and/or require a surfactant for templating. The films produced by these sol-gel processes are typically easy to damage and/or liable to delamination.

One of the few prior art processes for producing silica coatings without directly following the conventional sol-gel process is described in U.S. Pat. No. 6,231,989 assigned to Dow Corning Corporation. The patent describes a process of forming a coating from a solution comprising a resin containing at least two Si—H groups in a solvent, such as methylisobutylketone. The solution is coated to a substrate with about 5% of the solvent remaining in the coating. An aqueous basic catalyst causes condensation of the Si—H groups. The solvent is evaporated to leave a porous coating. In summary, the method uses an ammonia vapour step to improve adhesion and mechanical strength of the resultant film, but relies in the main part upon conventional sol-gel methods to produce the coating at room temperature and pressure. The preparation of suitable starting materials containing two Si—H groups is difficult, which limits the usefulness of the technique.

SUMMARY OF THE INVENTION

In one form, although it need not be the only or indeed the broadest form, the invention resides in a method of forming a silica or silica-like film coated on a substrate including the steps of: producing a precursor formulation having a water content of less than 5% by volume by adding oligomeric organosilicate to a solvent; coating a substrate with the precursor formulation; and curing the precursor formulation onto the substrate in an ammoniacal environment. The method is preferably performed at neutral pH. The solvent is suitably alcohol.

The oligomeric organosilicate may be obtained from a commercial supplier such as ColCoat Co Ltd of Japan. Suitable products include a range of methyl silicates (such as MS51), ethyl silicates (ES28, ES40 and ES48), N-propyl silicate and N-butyl silicate. Alternately the oligomeric organosilicate may be prepared by partial hydrolysis of organosilicate monomer (such as tetramethyl orthosilicate, tetraethyl orthosilicate, tetrapropyl orthosilicate, tetrabutyl orthosilicate, or mixed orthosilicates such as dimethoxydiethoxy orthosilicate).

The oligomeric organosilicate is suitably of the general formula $X_1[(X_2)(X_3)SiO]_nX_4$. Each X is not particularly restricted except that at least three of the groups are hydrolysable and preferably all the groups are hydrolysable. The inventors have found that each X may be different but is preferably an organic group and most preferably $C_1$-$C_4$ alkyl or aryl. $X_2$ and $X_3$ are preferably OR groups.

The precursor formulation may comprise about 0.01-1 parts water and 0.2-100 parts alcohol for each part of oligomeric organosilicate. An example ratio of reagents in the precursor formulation is 1.0 part oligomeric organosilicate: 0.1 part water: 10 parts alcohol.

The coating step is suitably performed by spin coating or dip coating. The method may further include the step of allowing the coating to settle before curing.

The curing step of the above method may be carried out by placing the coated substrate in a closed ammoniacal environment. The environment preferably contains water, ammonia and alcohol. The alcohol is suitably the same alcohol as used in the formation of the precursor.

It will be appreciated that the precursor is liquid during the coating step (before curing) and preferably at neutral pH, so the method does not follow the conventional sol-gel process described in the prior art. It will be further appreciated that the alcoholic ammoniacal curing environment is responsible for controlling the rates of hydrolysis and polycondensation in the post-deposited film, to create a nanoporous, stable, highly cross-linked silica network.

The method may further include the steps of controlling the alcohol content of the precursor and/or controlling the alcohol content in the ammoniacal environment, to control characteristics of the film.

Suitably the pore size may be related to the size of the alcohol molecule. The alcohol content in the precursor relates to the pore density which may also be related to the alcohol content in the ammoniacal environment.

The method is suitably carried out at or near room temperature and atmospheric pressure.

In a further form, the invention resides in a precursor formulation comprising: about 1 part oligomeric organosilicate; about 0.2-100 parts alcohol; and about 0.01-1 part water.

In still further form the invention resides in a silica or silica-like film having a refractive index between 1.1 and 1.56 and a film thickness less than 100 microns formed by a method including the steps of; producing a precursor formulation having a water content of no more than 5% by volume by adding oligomeric organosilicate to a solvent; coating a substrate with the precursor formulation; and curing the precursor formulation onto the substrate in an ammoniacal environment.

In yet another form the invention provides for the use of the silica or silica-like film coated on a transparent substrate to provide an anti-reflective and/or anti-fogging and/or protective coating.

In a yet further form of the invention the oligomeric organosilicate is not silicic acid tetramethyl ester homopolymer.

Throughout the specification the term "low refractive index" is intended to refer to a silica film of the invention having a refractive index less than silica glass in the wavelength range 200 nm to 20 □m.

DETAILED DESCRIPTION OF THE INVENTION

The oligomeric organosilicate has the general form

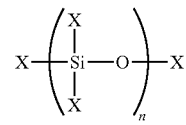

where at least three of the X groups are hydrolysable groups. Selection of the X groups is not particularly restricted and is discussed further below. Particular examples of these materials include methyl silicate and ethyl silicate, which are oligomeric forms of tetramethyl orthosilicate and tetraethyl orthosilicate, respectively. These materials are also known as tetramethoxy-silane and tetraethoxy-silane.

By way of example, the oligomer can be formed from the monomer by partial hydrolysis, as depicted in the following reactions:

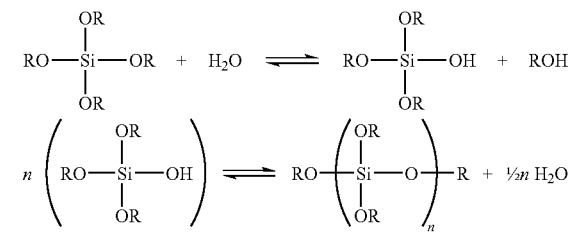

For commercially available methyl silicate n is 4 and for ethyl silicate it is typically 5. The degree of polymerisation in the oligomer is not particularly important.

When X is a hydrolysable group it is independently selected from a range of hydrolysable groups including but not limited to C1-C10 alkyl, preferably C1-C4 alkyl, aryl inclusive of phenyl or naphthyl, optionally substituted aryl, aryl C1-C4 alkyl inclusive of benzyl.

It will also be appreciated that X may be optionally substituted with one or more inert substituent such as halide, for example fluorine; aryls; heteroaryls; or any nitrogen, oxygen or sulphur containing substituent which does not interfere with the formation of the silica or silica-like film.

When X is a non-hydrolysable group it is independently selected from a range of non-hydrolysable groups consisting of alkyl, alkenyl, aryl or alkyl, alkenyl or aryl groups optionally substituted with halogen, nitrogen, oxygen, sulphur or silicon.

The precursor formulation is prepared by mixing the oligomer in a solvent. The solvent may be any solvent in which the oligomer is soluble but the inventors have found that alcohol is particularly appropriate. Suitable alcohols include methanol, ethanol, iso-propyl alcohol, butanol and pentanol.

An exemplary process for producing a film is described below.

EXAMPLE 1

Ethyl Silicate 40

50 ml of ethyl-silicate-40 (comprising >94% silicic acid tetraethyl ester homopolymer, <4% tetraethoxysilane, <4% ethanol) {supplied by COLCOAT CO. LTD. 3-28-6 Omorinishi, Ota-ku, Tokoyo 143-0015, Japan} is added to 100 ml of ethanol or methanol to form a precursor formulation.

The precursor formulation may comprise any alcohol that creates dispersed droplets throughout the precursor formulation to facilitate the formation of pores in the final film.

The precursor solution is applied to a substrate, in this example a glass slide, by dip coating.

Figure 1:
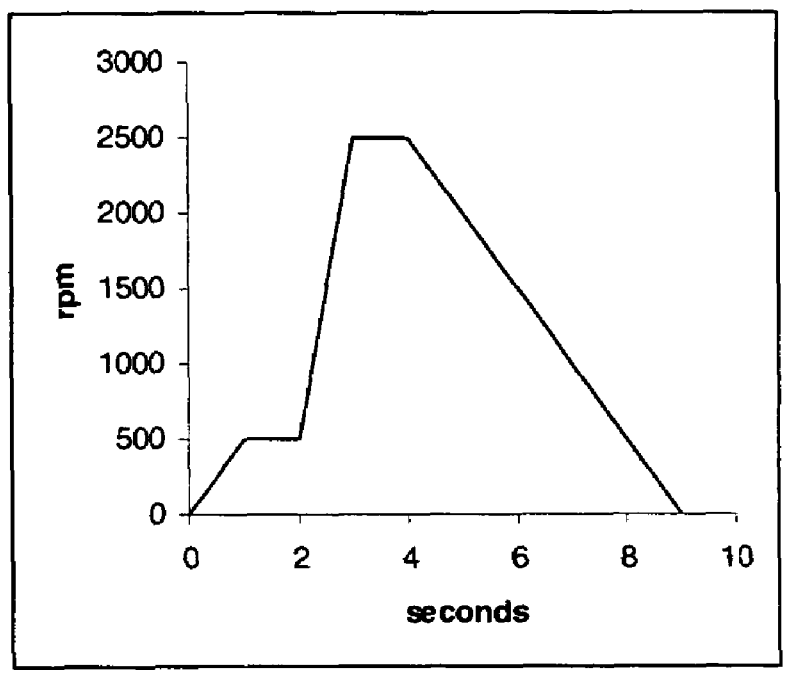
FIG. 1 is a spin profile for coating a substrate.

It will be appreciated that other deposition techniques such as spin coating and spraying may also be used to apply the precursor formulation to a substrate. A typical spin coating profile is to ramp to 500 rpm in 1 sec, spin for 1 sec at 500 rpm, ramp to 2500 rpm in 1 sec, spin at 2500 rpm for 1 sec, ramp down at 500 rpm per sec for 5 sec, as shown in FIG. 1.

It may be appropriate for the coated substrate to sit in an alcohol atmosphere for a time to allow equilibrium to be established between the alcohol in the atmosphere and the alcohol content of the precursor formulation on the substrate. As discussed below, the alcohol content in the precursor formulation influences the porosity of the film.

The coated substrate is then place in a closed container of approximately 30 litres volume containing a curing agent (20 ml aqueous ammonia 28% solution and 20 ml alcohol), which creates an appropriate ammoniacal atmosphere for the silica film to cure. The container is arranged in such a manner that the film is never in contact with the curing liquid. This curing step continues until the film solidifies and becomes mechanically robust.

Figure 2:
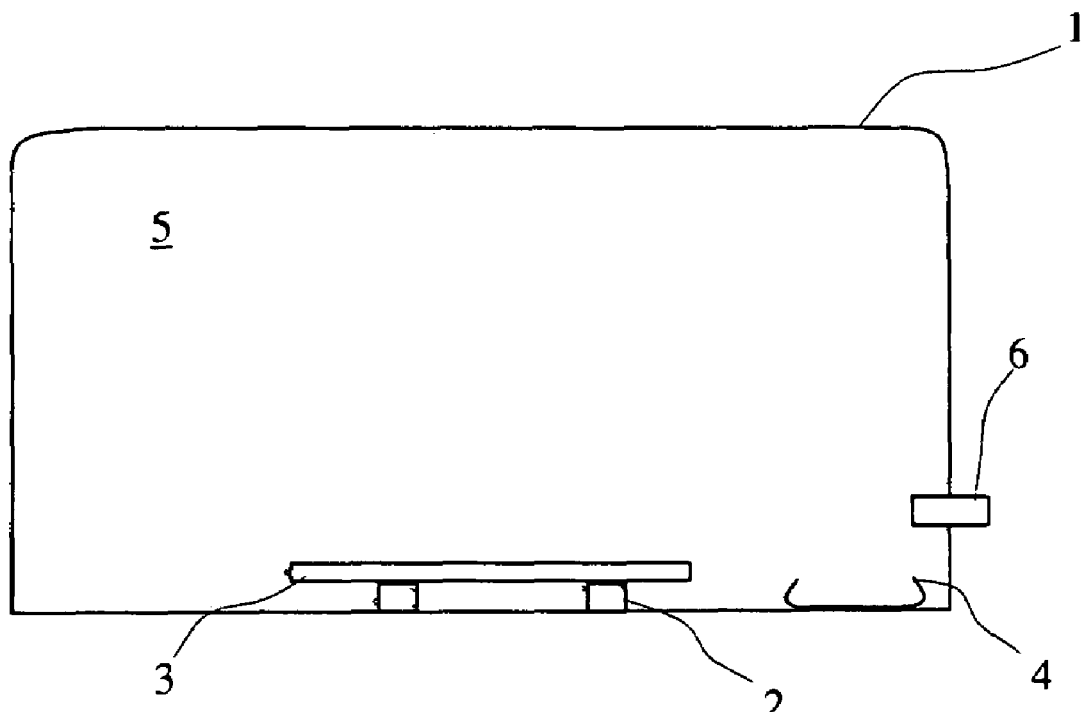
FIG. 2 is a schematic of a curing chamber.

A schematic of a curing chamber 1 is shown in FIG. 2. The chamber 1 is a closed system having some form of mount 2 in the base for receiving the substrate 3. A reservoir 4 is filled with a mixture of ammonia, alcohol and water which evaporates to produce an atmosphere 5 having a composition determined by the partial pressures of the ammonia, water and alcohol at the applicable temperature and pressure. A port 6 may be provided so that the mixture in the reservoir can be adjusted without opening the chamber.

It will be appreciated that any quantities of water, alcohol and ammonia/ammonium hydroxide may be used to create the ammoniacal atmosphere to cure the silica film.

The porosity of the produced film is determined, at least in part, by the alcohol in the precursor formulation prior to curing. The alcohol in the precursor formulation is understood to produce pores in the film which remain after curing. The density of the pores is determined, at least in part, by the amount of alcohol present in the precursor formulation during curing, whereas the size of the pores is determined by the type of alcohol. A large polyol produces a larger pore size than, say, methanol or ethanol.

During the curing stage the water in the ammoniacal atmosphere causes hydrolysis of the precursor formulation. Equilibrium is established between the alcohol in the precursor formulation and the alcohol in the ammoniacal atmosphere. This means that the final porosity of the film can be controlled by placing the coated substrate in an alcohol environment prior to introducing ammonia to the chamber to catalyse the silica cross-linking reaction.

The hydrolysis reaction equation during curing for the example of oligomeric tetraethoxysilane ($R = C_2H_5$) is:

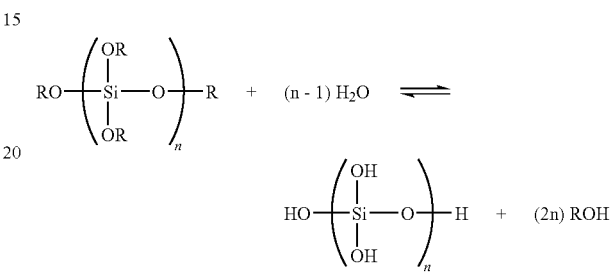

EXAMPLE 2

Ethyltrimethoxysilane

Monomeric ethyltrimethoxysilane (ETOS) {supplied by Sigma-Aldrich, Castle Hill, NSW Australia} is mixed with water in the molar ratio of 1 part ETOS to 2 parts water with sufficient ethanol added to dissolve the ETOS. This mixture is allowed to react and form a silica oligomer.

The precursor formulation is formed by adding 10 ml ethanol or methanol to 10 ml of the silica oligomer.

The precursor solution is applied to a substrate, in this example a glass slide, by placing some drops of the precursor solution on the surface and allowing them to spread and flow under gravity.

The coated substrate is then place in a closed container of approximately 30 litres volume containing a curing agent (20 ml aqueous ammonia 28% solution and 20 ml alcohol), which creates an appropriate ammoniacal atmosphere for the silica film to cure.

EXAMPLE 3

Methyltrimethoxysilane

Monomeric methyltrimethoxysilane (MTOS) {supplied by Sigma-Aldrich, Castle Hill, NSW Australia} is mixed with water in the molar ratios of 1 part MTOS to 3 parts water with sufficient ethanol added to dissolve the MTOS. This mixture is allowed to react and form a silica oligomer. Other ratios of 1 part MTOS to 2 parts or 4 parts water were also found to be suitable.

The precursor formulation is formed by adding 10 ml ethanol or methanol to 10 ml of the silica oligomer. Other dilutions of 20 ml, 40 ml and 80 ml ethanol were also found to be suitable.

The coated substrate is then place in a closed container of approximately 30 litres volume containing a curing agent (20 ml aqueous ammonia 28% solution and 20 ml alcohol), which creates an appropriate ammoniacal atmosphere for the silica film to cure.

It will be appreciated that the prior art processes, such as found in U.S. Pat. No. 5,698,266, produce films of weakly bonded nano-particles of silica whereas the process described above produces a continuous, interconnected, nano-porous silica network. Hence the film is stronger and the characteristics of the film (porosity and refractive index) can be controlled.

The films of the above examples, and films produced in a similar manner to these examples, were physically characterised. The results of the physical characterisation are summarised below.

Optical Transparency

The optical transparency of the films was determined using a Perkin Elmer Lamba 40 UV-Visible Spectrophotometer, having the following scan settings:

| | |
|---|---|
| Slit width | 2 nm, |
| Scan speed | 240 nm/min, |
| Data interval | 1 nm. |

An empty sample arm was used to determine the background spectra for correction purposes.

Figure 3:
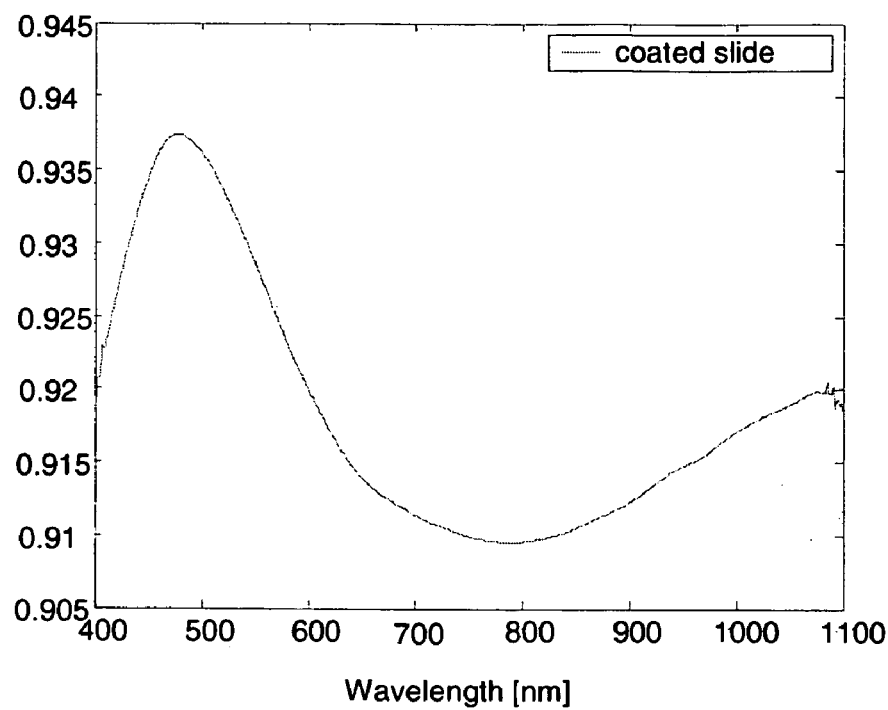
FIG. 3 is a graph of the UV-visible optical transmission spectrum of the film of Example 1.

The UV-Visible optical transmission spectrum was measured for the thin film (film thickness of less than 2 microns) of a film similar to Example 1. The spectrum is shown in FIG. 3. The key feature of these spectra is the high optical transmission of the coated glass substrate over the entire visible spectrum. This observation may also be confirmed by simply looking a the coated glass substrate which appears transparent to the eye.

Figure 4:
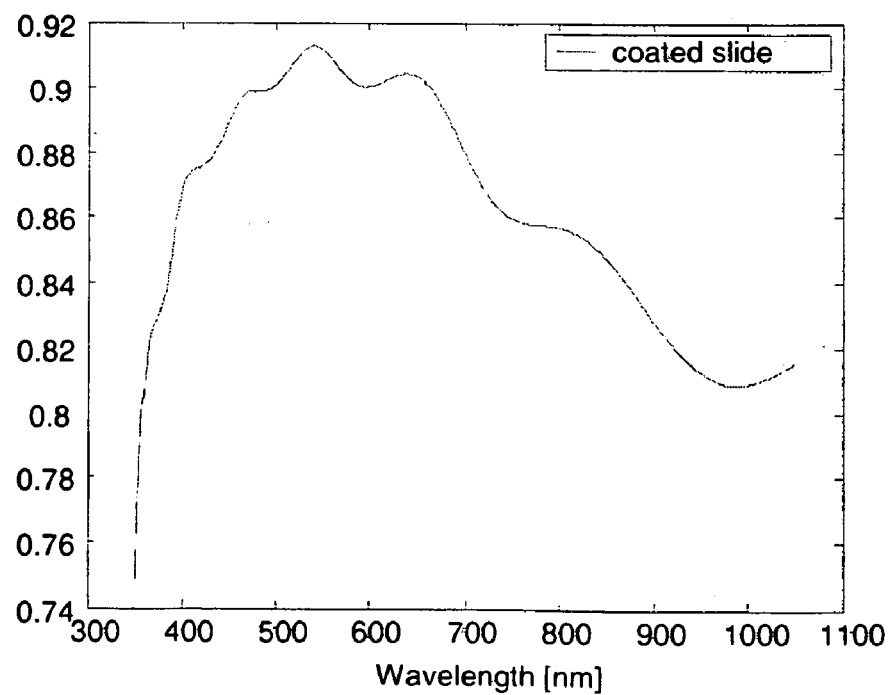
FIG. 4 is a graph of the UV-visible optical transmission spectrum of a spin coated film of silica on glass produced by the method of the invention.

FIG. 4 is a UV-Visible optical transmission spectrum for a silica film, having a film thickness of approximately 4 microns, formed in a similar manner to Example 1. The film used for this test was thicker than that used in FIG. 3 evidenced by the interference fringes, peaks and troughs, as a function of wavelength. The fringe contrast is appreciable (~5%), indicating that the refractive index of the film is <1.3.

Figure 5:
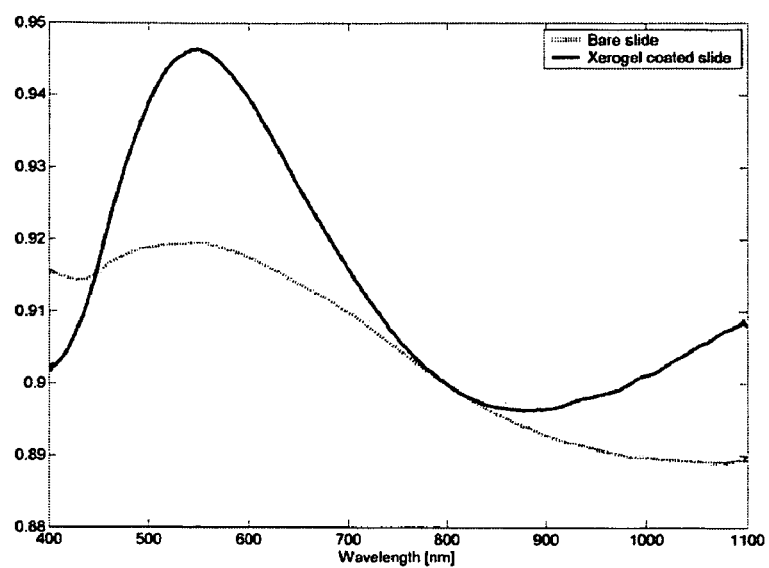
FIG. 5 is a UV-visible optical transmission spectra for an uncoated glass slide and a glass slide coated with an anti-reflective silica film formed by the method of the invention.

By way of comparison, FIG. 5 shows a transmission spectrum of a film similar to that of FIG. 3 with the transmission spectrum of an uncoated glass slide. Ordinarily, ~4% of incident light is reflected from each glass-air interface, leading to a normal transmission of ~92% for an uncoated glass substrate. FIG. 5 shows the increase (~94.6%) in transmission that can be achieved by coating one side of a glass substrate with a low refractive index film produced by the new process. Theoretically, a thin film of refractive index ~1.22, and of an appropriate thickness, would be the perfect anti-reflective coating for glass, as it would have a 96% transmission for a single sided coating. This transmission value is very close to the experimental value. Showing that the films of the current invention are effective anti-reflective coatings for glass.

Scratch Resistance

The hardness test or scratch resistance test was conducted by taking a set of pencils ranging in hardness from 2B (soft) to 7H (quite hard) and attempting to scratch the film's surface of Example 1. None of these pencils were able to scratch the material, leading to the conclusion that the material hardness is >7H on the pencil scale.

These hardness and scratch resistance results indicate that the films of the current invention are similar to glass and significantly better than vacuum coated dielectric low refractive index coatings.

X-Ray Diffraction

Figure 6:
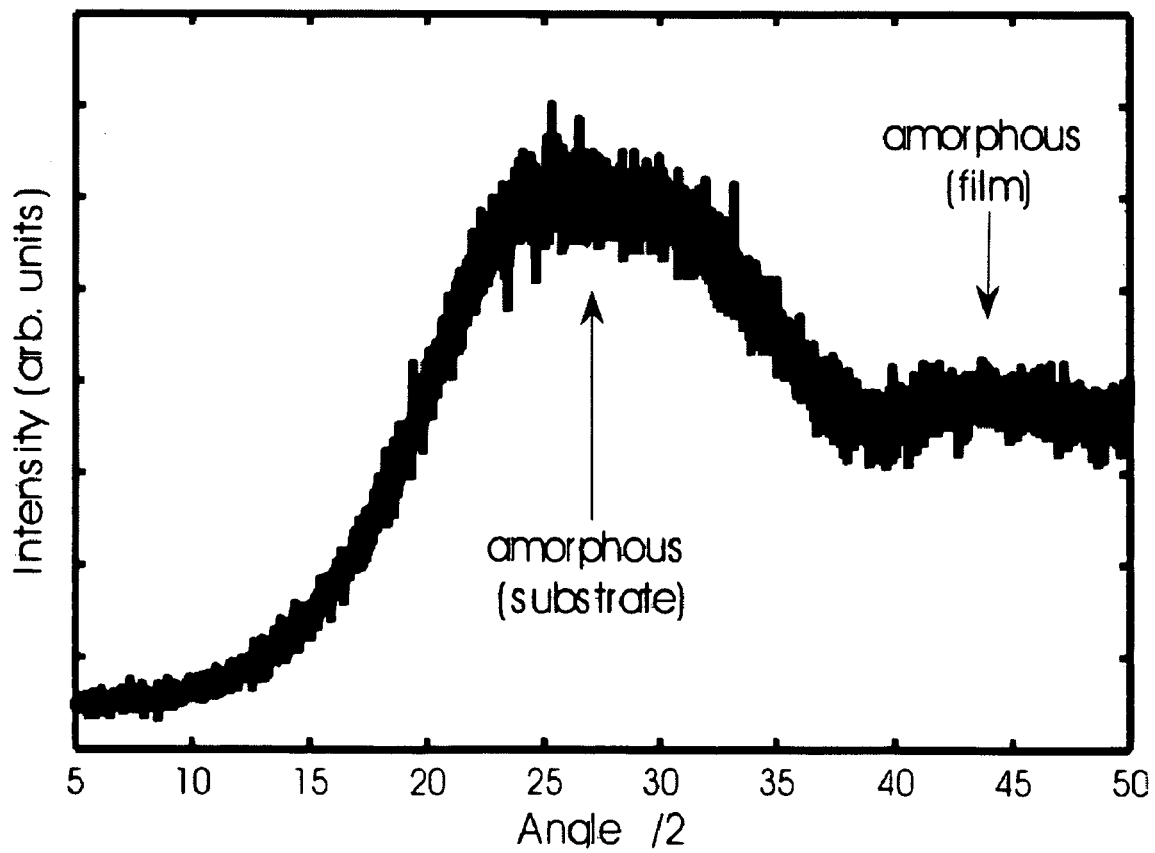
FIG. 6 is an x-ray diffraction image of a film on a glass substrate.

An x-ray diffraction scan of a glass slide coated with a film similar to example 1 is shown in FIG. 6. The spike close to zero degrees is an artefact and the bulge is normal. This demonstrates that the film is amorphous and there is no appreciable crystallisation occurring.

Solvent Resistance

The films were found to be resistant to washing with water, alcohols, common acids and alkalis.

Anti-Fogging

The films formed by the method of Example 1 have been found to provide effective anti-fogging properties. The porosity or surface area of the silica films is approximately 150 $m^2/g$, using standard nitrogen adsorption-absorption techniques. It is believed that coatings having a minimum surface area of 10 $m^2/g$ will exhibit anti-fogging properties.

It is believed that the anti-fogging properties of the films of the invention are due to the hydrophilicity and high surface area of the films. It is thought that the high surface area and hydrophilicity of the films allows atmospheric water to be absorbed onto the film, thus preventing water droplets from forming.

The thin films produced by this method have been found to have a number of favourable characteristics, including: a low refractive index in the visible spectrum, typically 1.1 to 1.56; high optical transparency; high optical and thickness uniformity; mechanical robustness similar to glass; chemical and photochemical properties similar to glass; high porosity, leading to efficient anti-fogging behaviour; excellent adhesion to conventional substrates, such as glasses, plastics, metals, ceramics, semiconductors, and the like; and durability/long term stability.

A number of features of the films of the current invention may be tailored or tunable to suit the final application of the film, for example:

Tunable refractive index—The refractive index may be tuned according to need by adjusting the composition, in particular the alcohol and water content.

Tunable film thickness—The film thickness can be tuned by adjusting the initial alcohol and water contents in the precursor formulation and, can also be adjusted by varying the parameters relating to the deposition method, such as spin speed, viscosity, dip coating withdrawal rate, and the like using standard methods for the chosen coating technique.

The viscosity of the precursor formulation may be altered to facilitate its use in a range of applications, for example, a highly viscous formulation may be formed so that when sprayed onto a substrate to create a thin coverage of the precursor it does not flow significantly whilst curing.

The method of the current invention provides a low cost simple method for producing robust films with effective control over the thickness and refractive index of the coating, along with being able to coat a range of substrate materials and shapes.

The above properties make the films ideal candidates for cheap, robust, efficient optical coatings for applications including antireflection coatings, chemical and mechanical barrier coatings, anti-fogging coatings, anti-glare coatings (light diffusing effect), high reflectivity coatings, low refractive index supports and cladding and dielectric barrier layers.

The thin films of the invention may be employed as low refractive index optical coatings for anti-reflection coatings or as low and high refractive index materials in high-low refractive index multilayer coatings. As a low refractive index optical coating the silica thin films may be applied to all forms of glass including spectacles, windows, windscreens, decorative, etc.; coatings for CRT and other display devices such as computer monitors, televisions, etc.; coatings for solar cells; optical instrument coatings such as lenses, mirrors, and the like; active and passive optical waveguides in telecommunications, and advanced photonics; and optoelectronic devices.

The thin films may also be used as physical and chemical barrier coatings including, invisible metal and plastics protection, invisible protection for delicate optical surfaces.

The thin films may also be used as anti-fogging coatings for applications including automotive and marine glass, architectural glass, spectacles, windows of all sorts, bathroom mirrors and shower screens.

The films may also be produced with an additional component imbedded in the porous network to make the film an active coating. The nanoporous structure of the film also makes it potentially useful as a nanosieve.

It will be appreciated by the person skilled in the art that the above films may be formed on or applied to glass surfaces that are already in place, such as existing windows and mirrors. In aftermarket applications the precursor formulation may be mixed with the curing agent immediately prior to application, mixed during application such as through a common spray nozzle or after the precursor formulation has been applied to a substrate. The precursor formulation may be applied by coating, wiping or spraying the respective component onto the substrate being treated. The curing agent may be any gaseous or aqueous strong alkali, including ammonia, alkali metal hydroxides, quaternary alkyl ammonium hydroxides and the like.

Throughout the specification the aim has been to describe the preferred embodiments of the invention without limiting the invention to any one embodiment or specific collection of features.

Throughout this specification, unless the context requires otherwise, the word "comprises", and variations such as "comprise" or "comprising", will be understood to imply the inclusion of a stated integer or group of integers or steps but not to the exclusion of any other integer or group of integers.

The invention claimed is:

1. A method of forming a silica or silica-like film coated on a substrate including the steps of:
producing a precursor formulation having a ratio of reagents of 1.0 part by volume oligomeric organosilicate; 0.1 part by volume water; 10.0 parts by volume;
coating a substrate with the precursor formulation; and
curing the precursor formulation onto the substrate in an ammoniacal environment.

2. The method of claim 1 wherein the precursor formulation is formed by adding an oligomeric organosilicate comprising silicic acid tetraethyl ester homopolymer, tetraethoxysilane and ethanol, to the solvent comprising an alcohol.

3. The method of claim 1 wherein the coating is performed by spin coating or dipping.

4. The method of claim 1 wherein the coating further includes allowing the coating to settle before curing.

5. The method of claim 1 wherein the film comprises a continuous, interconnected, nano-porous silica network.

6. The method of claim 1 wherein the curing is carried out by placing the coated substrate in a closed ammoniacal environment.

7. The method of claim 6 wherein the ammoniacal environment contains water, ammonia and alcohol.

8. The method of claim 7 wherein the alcohol contained in the ammoniacal environment is the same alcohol as used in the formation of the precursor formulation.

9. The method of claim 1 further including controlling the alcohol content to control characteristics of the film.

10. The method of claim 7 further including controlling the alcohol content in the ammoniacal environment to control characteristics of the film.

11. The method of claim 1 further including controlling a pore size of the film by controlling the alcohol content and type in the precursor formulation.

12. The method of claim 7 further including controlling a pore density of the film by controlling the alcohol content and type in the ammoniacal environment.

13. The method of claim 7 further including controlling a porosity of the film by controlling the alcohol content and type in the precursor formulation and alcohol content and type in the ammoniacal environment.

14. A method of forming a silica or silica-like film coated on a substrate including the steps of:
producing a precursor formulation having a ratio of reagents of 1.0 part by volume oligomeric organosilicate; 0.1 part by volume water; 10.0 parts by volume;
coating a substrate with the precursor formulation;
placing the coated substrate in a closed solvent environment;
establishing equilibrium between the alcohol in the precursor formulation and the solvent environment; and
curing the precursor formulation onto the substrate in an ammoniacal environment containing solvent by introducing ammonia vapour and water vapour to the closed solvent environment.

15. The method of claim 1 wherein the oligomeric organosilicate is not silicic acid tetramethyl ester homopolymer.

* * * * *

UNITED STATES PATENT AND TRADEMARK OFFICE
CERTIFICATE OF CORRECTION

PATENT NO. : 7,642,199 B2
APPLICATION NO. : 11/444283
DATED : January 5, 2010
INVENTOR(S) : Paul Meredith et al.

It is certified that error appears in the above-identified patent and that said Letters Patent is hereby corrected as shown below:

Column 9, line 51, claim 1 (Examiner's Amendment attached to Supplemental Notice of Allowability dated 9-15-09, page 2, line 17, claim 1), after second occurrence of "volume", insert --alcohol--.

Column 10, line 40, claim 14 (Examiner's Amendment attached to Supplemental Notice of Allowability dated 9-15-09, page 3, line 9, claim 24), after second occurrence of "volume", insert --alcohol--.

Signed and Sealed this

Thirteenth Day of April, 2010

David J. Kappos
*Director of the United States Patent and Trademark Office*